E. F. CÔTE & P. R. PIERRON.
ELECTRIC FURNACE PERMITTING THE EXTRACTION IN A STATE OF PURITY OF ZINC FROM ITS ORES.
APPLICATION FILED JULY 24, 1914.

1,184,520.  Patented May 23, 1916.
4 SHEETS—SHEET 1.

Witnesses:
Edw. Thorpe
J. C. Larsen

Inventors
Eugène François Côte
Paul Rambert Pierron
By Munn & Co.
Attorneys

Fig. 5.

E. F. CÔTE & P. R. PIERRON.
ELECTRIC FURNACE PERMITTING THE EXTRACTION IN A STATE OF PURITY OF ZINC FROM ITS ORES.
APPLICATION FILED JULY 24, 1914.

1,184,520.

Patented May 23, 1916.
4 SHEETS—SHEET 4.

UNITED STATES PATENT OFFICE.

EUGÈNE FRANÇOIS CÔTE AND PAUL RAMBERT PIERRON, OF LYON, FRANCE, ASSIGNORS TO SOCIÉTÉ ANONYME POUR L'ELECTROMÉTALLURGIE DU ZINC, PROCÉDÉS CÔTE ET PIERRON, OF LYON, FRANCE.

ELECTRIC FURNACE PERMITTING THE EXTRACTION IN A STATE OF PURITY OF ZINC FROM ITS ORES.

1,184,520.  Specification of Letters Patent.  Patented May 23, 1916.

Application filed July 24, 1914. Serial No. 852,864.

*To all whom it may concern:*

Be it known that we, EUGÈNE FRANÇOIS CÔTE and PAUL RAMBERT PIERRON, both of 6 Rue Grolée, in the city of Lyon, Rhône, Republic of France, have invented an Electric Furnace Permitting the Extraction in a State of Purity of Zinc from Its Ores, of which the following is a full, clear, and exact description.

The present invention relates to an electric furnace permitting the direct extraction in a state of purity of zinc from its ores.

It is known that the generality of zinc ores are complex, that is to say, they are mixed with ores of other metals, lead, iron and others. It is thus, for example, that blende, is very frequently associated with galena and iron pyrites. The mechanical preparation even pushed very far does not permit of completely separating these ores from each other. Blende passes away with the galena and pyrites, and not only the zinc is lost when treating these two latter ores for lead or for iron, but further it impedes the working of the furnaces. Similarly, galena and pyrites especially, remain in the blende and render the treatment of the latter very difficult by Belgian and Silesian methods and furnaces. It is therefore necessary in the present state of the metallurgy, either to lose much zinc, at the time of the mechanical preparation, and suffer inconvenience in the working of the furnaces, which is prejudicial to their economic output, or to abandon these ores however very abundant. The electrothermic treatment of these ores, conformably with the present invention, enables these grave inconveniences to be avoided. On the other hand, the Belgian-Silesian processes, do not permit of treating all ores. It is particularly the case with ores containing fluorine, which are frequently met with. The preliminary roasting, which is indispensable for the treatment in Belgian-Silesian furnaces, is impossible, so that until now it has not been possible to make use of these ores which were abandoned. The electrothermic treatment enables these ores to be treated. With the electric furnace, not only fluor spar offers no inconvenience but, on the contrary, it facilitates fusion and presents advantages. These considerations show clearly what interest is presented by the putting in practice of the industrial extraction of zinc from its ores by electrothermic means. But it is not sufficient to apply the methods and apparatus known in electro metallurgy to enable the extraction of zinc to be obtained in the pure state and under really practical conditions. In effect, if it is desired to profit from the principal advantage of the electric furnace, which is of being able to treat rapidly large charges of ores, in a practically continuous manner and with very little labor, in apparatuses of very small capacity, serious inconveniences are encountered. Whatever precautions are taken, whatever the method employed and the furnace used it is impossible to obtain by first fusion metal sufficiently pure and to prevent a considerable part from condensing in the form of zinc powder. It is therefore necessary in following operations to refine the metal and redistil the zinc powder. This subsequent operation of refining complicates the process, necessitates cumbersome plant and causes the electrothermic treatment to lose its economy.

The new process has for its object to remedy this inconvenience; and it is characterized essentially by the fact that the metal, having been separated from the ore in rough state in an electric furnace, preferably an arc and resistance furnace, is refined as it is being produced, while it is still at a temperature near the point of volatilization, in such manner as to obtain directly pure zinc, with the minimum expense of calories, with the minimum of labor and without losses.

The furnace, enabling the new process to be put in operation, is constituted by the union of two furnaces, combined in such manner as to form practically only a single apparatus. They are formed: the first, of a furnace of the type called "arc and resistance furnace," in which the ore is melted with the appropriate reducers and fluxes to disengage therefrom the zinc in vapor; the second, of a furnace of the type called "indirect resistance furnace," which receives in the form of drops and of zinc powder the rough metal and without allowing it to cool, with a small addition of calories, separates it from all the impurities carried with it, by submitting it to a second distillation accompanied with condensation to the fluid state.

The process and apparatus, which are the object of the invention, enable this important result to be obtained of producing in economic conditions very pure zinc when treating the most complex ores.

The furnace of the arc and resistance type is adopted by preference, to form the first part of the apparatus, as it enables the rough metal to be extracted most conveniently and with the best output. This furnace produces more zinc powder and introduces into the metal more impurities than other furnaces, but, in the process forming the object of the invention, the formation of this powder and the presence of impurities have no inconveniences. In effect the drops of metal and the zinc powder yielded by the fusion of the ore in this furnace, pass off automatically and in the course of their production into the second furnace, combined with the first, in which the rough metal and the powder are immediately redistilled while they are still at a temperature near that of the vaporization of zinc. This second furnace is characterized by the division of its space into three parts. The upper part receives the zinc vapors coming from the first furnace; there, these vapors condense into metallic drops and into powder, at the same time separating from the gases which arise with them from the bed of fusion and which are eliminated automatically, as they would subsequently prevent the condensation of the zinc vapors to the fluid state. The intermediate part is occupied by pieces of carbon which an electric current maintains at a red white heat by Joule's effect. The drops of metal and the zinc powder pass through this carbon and are there volatilized with a very small addition of calories. The zinc thus distils in the absence of any gaseous current, susceptible of impeding the condensation of the vapors, into the form of fluid zinc, and all the impurities remain in the carbon which must be renewed from time to time so that these vapors, which pass into the third part of the apparatus constituting a condenser, are there totally transformed into molten zinc of great purity.

By way of example and to show the practical realization of the process, there will be hereinafter described a type of apparatus which, among the various possible forms of execution, gives the best results.

The arc and resistance furnace, which constitutes the first part of the apparatus and which is intended to melt the ore and to yield the rough metal, is composed of a container $a$, Figs. 1 to 4, of refractory material, the bottom of which is of brick or pisé work of electric carbon forming one of the electrodes. This container, to which is preferably given a cylindrical form, is covered with an arch of extra refractory products, and the whole is constructed in a strong metallic casing formed of sheet iron plates and angle irons. The arch is traversed at its center by an electrode $b$ vertically movable. The current is conveyed to it by a metallic collar $a'$ on which are fixed conducting plates $c$. After having traversed the container, the current leaves it by the bottom which is in contact with the metallic casing. This is encircled at its upper edge by a copper band, on which are fixed other conducting plates $d$ serving for the return of the current. In this manner, the electric circuit such as formed between the starting pole of the transformer feeding the furnace, the conducting bars leading to the movable electrode, said electrode, the burden or mixture of ores and fluxes, furnace shaft and its metal fittings, and conducting bars leading back the current to the return pole of the transformer, is traversed by none of the metallic pieces of the furnace, thus permitting it, when supplying it with alternating currents, to be a good carrier of power without being obliged to complicate the construction.

The charges of ore with their fluxes are introduced into the container $a$ through openings $e$ made in the arch and closed by movable bricks. In the case of sulfurous ores, these are introduced raw into the furnace, either with ribbons or with granules of iron or of cast iron, or with quick lime or carbon. In the case of calamines, the ore, previously calcined, is melted after having been mixed with the desired quantity of reducing carbon and suitable fluxes. It is similar for blendes which are previously roasted. After fusion and exhaustion of the zinc contained, by the electric current which forms an arc on their surface and then traverses them, heating them by Joule's effect, the charges are evacuated through a spout $f$ prolonging to the exterior the tap hole made at the bottom of the fusion crucible.

Figure 1:
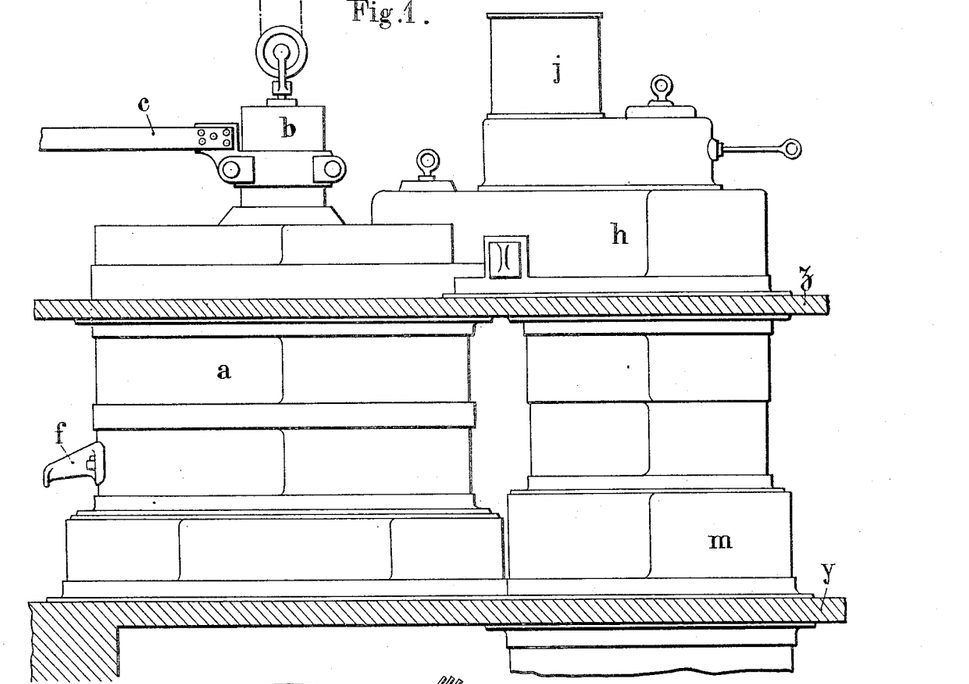
Figures 1 and 2 represent in elevation and in plan the new apparatus.
Figure 2:
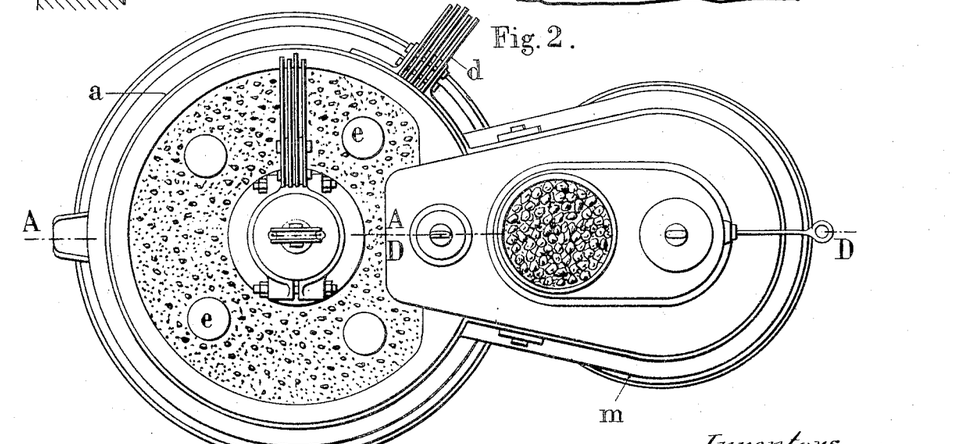
Figure 3:
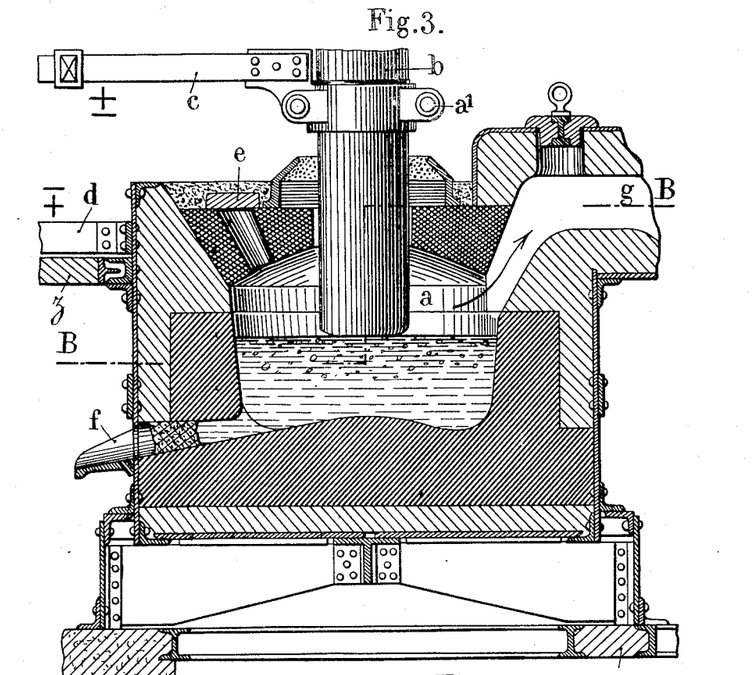
Fig. 3 is a vertical section of the fusion furnace drawn through A—A of Fig. 2.
Figure 4:
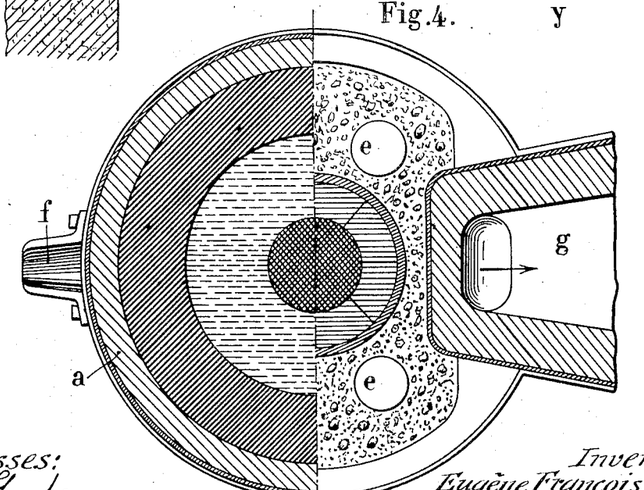
Fig. 4 is a horizontal section drawn on the line B—B of Fig. 3.
Figure 5:
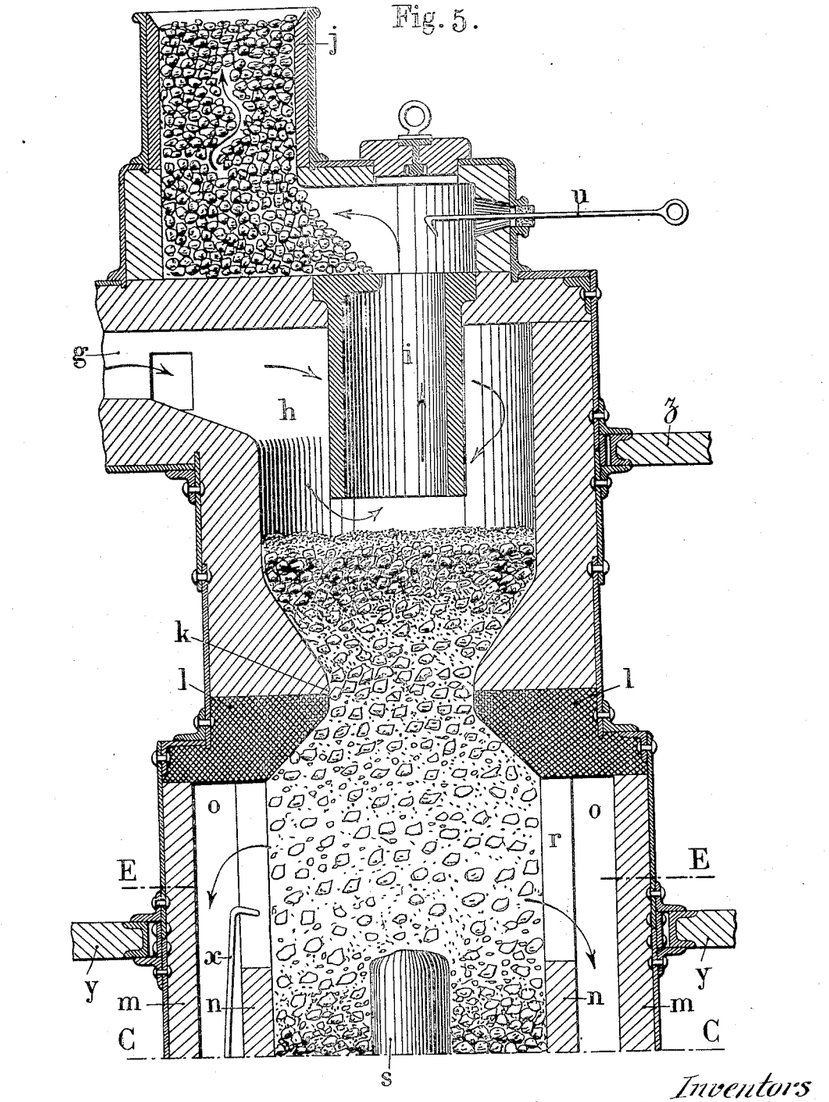
Figs. 5 and 5ᵃ, which join on the line C—C, represent a vertical section drawn on the line D—D of Fig. 2 to an enlarged scale.
Figure 5A:
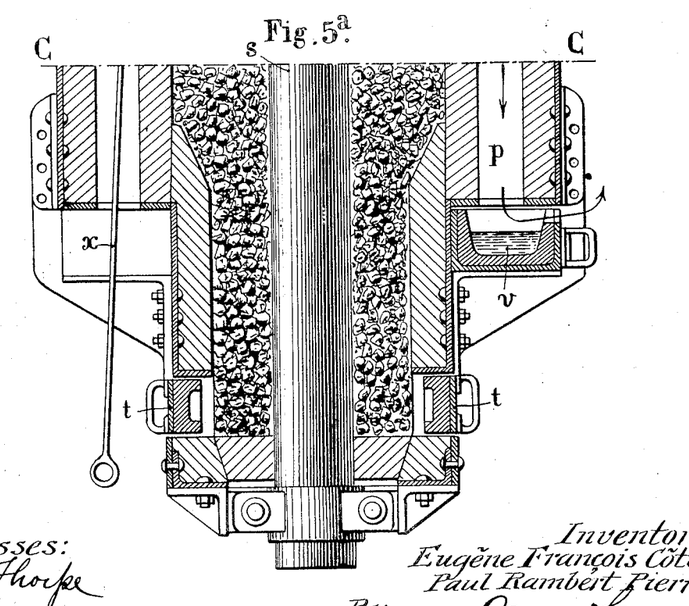
Figure 6:
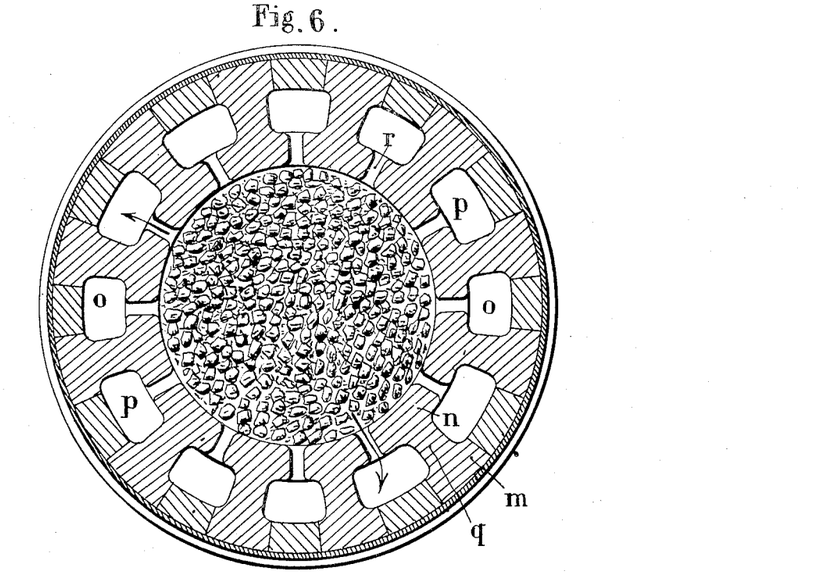
Fig. 6 is a horizontal section drawn on the line E—E of Fig. 5.

The second part of the apparatus in which the rough metal is refined is represented in detail at Figs. 5, 5ᵃ and 6; it is united to the first part by a large channel $g$ through which pass the zinc vapors. This second part of the apparatus has the form of a vertical cylindrical container of a height considerably greater than its diameter. The zinc vapors and the gases issued from the bed of fusion arrive through the channel $g$ into the upper part $h$, the axis of which is occupied by a large refractory tube $i$. The entire apparatus is otherwise built of refractory bricks arranged in a solid metallic casing in the form of a cylindrical column.

Above the channel $g$ and the chamber $h$ and communicating with the tube $i$ is a hollow cylinder $j$ filled with carbon in large pieces. Below the tube $i$, the chamber $h$ contains carbon also in large pieces, composing the upper part of the column of carbon which occupies all the rest of the container. It will be seen later by means of what mechanism the zinc vapors and the gases arriving at $h$ cannot enter this column of carbon.

In the chamber $h$ the metallic vapors condense into larger or smaller drops and into zinc powder, which fall onto the surface of the carbon. The incombustible gases, which greatly impede the transformation of the zinc vapors into fluid metal and which it is of importance to eliminate as quickly as possible, are obliged in order to find an escape into the atmosphere, to follow the way indicated by the arrows, that is to say, to pass through the tube $i$ from below upward, then to filter through the pieces of carbon filling the cylindrical container $j$. The major part of the zinc powder carried with it is deposited in the tube $i$, and the last traces are deposited in $j$ on the surface of the pieces of carbon forming an infinity of interruptions interposed to the gaseous current. Thus is realized this first very important point in the working of a zinc furnace and which consists in the separation of the troublesome gases from the condensing metallic vapors.

Below the chamber $h$, the interior space of the apparatus has a narrowing $k$, the lower part of which is formed by a current conducting ring $l$ formed of graphite bricks; the current is conveyed to it by the metallic casing of the apparatus itself, against which it is tightly fastened. This casing is connected electrically to the same pole as the container $a$ of the arc furnace. Below this ring $l$ and at a height corresponding to about one third of the container, the refractory casing of this latter is hollow. It is formed by two concentric sides $m$ and $n$, leaving between them an annular space $o$ which is uniformly divided into a certain number of vertical compartments $p$ by divisions $q$, Fig. 6. Vertical slits $r$, Fig. 5, at their upper half, cause these compartments to communicate with the interior of the container filled with pieces of carbon. The axis of this container is at its lower part occupied by a vertical electrode $s$, connected to the pole opposite to that of the conducting ring $l$. Between this ring and the upper end of the electrode $s$ an electric current can therefore pass through the pieces of carbon; it heats them by the Joule effect and, by a suitable regulation of the distance of these two electrodes, according to the voltage employed and the section of the column of carbon traversed, it furnishes to these pieces of carbon such an addition of calories that by adding them to those of the rough zinc which arrives very little cooled in this region of the apparatus, there always reigns in it a sufficient temperature to distil the metal. Quite at the lower part of the container, just above the bottom which closes it, is a certain number of doors $t$ symmetrically arranged around the periphery, and which serve at the desired times to extract the carbon from the container.

The parts being thus arranged, it will be seen that if the carbon is extracted through these doors $t$, the entire column descends as in an ordinary flowing furnace; at $h$ the empty space below the tube $i$ increases in size, and the drops and zinc powder which are deposited on the surface of the pieces of carbon at the upper part of the column, slide into the subjacent layers by the effect of movement of the pieces of carbon. On the other part, if the primitive level of the column is reëstablished by causing to fall from the container $j$ through the tube $i$, by moving a rake $u$ through a small opening having an airtight joint, a quantity of carbon equal to that extracted through the doors $t$, the layer of drops and of zinc powder previously deposited on the upper surface of the column will be imprisoned between two beds of carbon. The pieces of carbon fallen from $j$ automatically carry with them the zinc powder which they have retained in filtering the incondensible gases. On the new layer which they form at the primitive level of the column of carbon, a new layer of drops and zinc powder is deposited; another extraction of carbon through the doors $t$ followed by a new fall of carbon from the filter $j$, causes this latter bed of drops and zinc powder to be similarly interposed between two layers of carbon and so on. The container of the apparatus contains therefore alternate beds of carbon and metal.

The zinc powder which comes and fills the interstices between the carbon composing the layers situated above the narrow part $k$ of the column, renders these layers tight in the manner of a partition, separating the vapors and gases which arrive above them in $h$ and $i$ from the zinc vapors which are produced below by the following mechanism.

The drops and the zinc powder, mixed with the carbon which, in the descending movement of the column, occupy the zone comprised between the ring $l$ and the upper end of the electrode $s$, are volatilized at the temperature of red white heat, at which the pieces of carbon of this zone are held by the passage of the current. The zinc vapors, produced therefore in the absence of all gases capable of impeding their condensation, pass through the slits $r$ and are liquefied in the compartments $p$ which thus act as so many independent condensers.

It is important to remark that these condensers utilize the exterior calorific radiation of the distillation retort and thus the supplementary heating of these apparatuses, which is necessary in the old processes, for maintaining them at the relatively high temperature required for a good condensation of zinc vapors to the fluid state, is here realized naturally without any expenditure of fuel or of electric energy.

The thickness of the exterior side $m$ is determined experimentally in such manner that the quantity of heat, which it allows to pass to the exterior by radiation, shall be just sufficient to maintain in the compartments $p$ the most favorable temperature for the complete liquefaction of the zinc vapors.

In effecting, in a suitable manner, the extractions of carbon through the doors $t$ and the falls from $j$ into $h$ by means of the rake $u$, the descending movement of the column of carbon can be sufficiently easily regulated so that all the zinc shall be volatilized in the passage of the zone comprised between the ring $l$ and the upper end of the electrode $s$. And this regulation of the fall can be effected in such manner that many drops and much zinc powder pass into the distillation zone for small quantities of carbon displaced. Besides the carbon withdrawn through the doors $t$ is sufficiently cold and little enough impure to be able in major part, that is to say, without appreciable loss, to be recharged into the upper container $j$, whence it runs a new cycle. There results from this that the consumption of carbon is very small in relation to the quantity of metal that it serves to distil. This carbon retains on its surface the impurities drawn along by the zinc vapors into the chamber $h$, and a sifting is sufficient to eliminate these impurities which constitute drosses and the major part of which is added to the charges of ore in the first furnace $a$.

In the lower part of the container, below the distillation zone, the carbon cools and condenses small portions of zinc vapors which have been able to filter into the interstices not filled by the drosses detaching from the portions of carbon, by the effect of shaking due to the descending movement of the column; the product of this condensation is collected in the form of molten zinc which flows below the carbon, at the time of extractions through the doors $t$. At the same time are collected the large drops of metal formed in the space $h$ and which in consequence of their size, have been able to traverse rapidly the vaporization zone without remaining in it; they are formed of zinc sufficiently pure to prevent altering the value of the redistilled metal, with which they mix. But almost the whole of the zinc vapors, deprived of all impurities, pass into the compartments $p$ of the condenser, in which they completely liquefy. The metal flows as it is produced into little removable ingot molds $v$ of the same number as the compartments, and serving as bottoms to them. These are receivers of refractory products inclosed in kinds of metallic drawers. They have on the upper part of their front face, a small opening for the escape of traces of carbon monoxid, which arise from the reduction by the carbon of the oxid of zinc which the distilled powder contains.

When one of the ingot molds is full, it is withdrawn and for it is immediately substituted an empty one. The metal which it has collected solidifies in the form of an ingot, which readily leaves the mold and can be delivered in such form upon the market. When one of these ingot molds $v$ has left its compartment, access to the interior of the corresponding division $p$ of the condenser is free at its lower part; a rake $x$ can therefore be introduced into it to effect all necessary cleansing or clearing, and this can be done during the full working of the furnace without interfering in any way with the working of the other parts of the apparatus. This arrangement enables the disengagement of fumes and the losses of zinc to be reduced to the minimum; the gases and vapors always tending to rise, by thus opening from below the compartments of the condenser, and by suppressing any opening at their upper part, the access of air to their interior is almost completely prevented. Further this system furnishes the possibility of employing continuously working furnaces and distilling apparatuses of very great yield, which are necessary conditions for obtaining the maximum of yield and of economy, as these condensation apparatuses can always be cleaned by successive elements, without risk of explosion, with the minimum of losses and the maximum of convenience.

The collection of the apparatuses is supported by a solid strengthened floor $y$; a platform $z$ at the upper part serves for the charging operations. The drops and zinc powder which are deposited in the chamber $h$ and the gases which filter in $j$ being at very high temperature, very little electric current is necessary to bring into the redistillation zone the necessary calories for the refinement of the rough metal. Lastly, as will be understood, all losses of metal are avoided and the labor which the working of the second part of the apparatus requires represents only a very small supplement to that devoted to the working of the ore fusion furnace.

The apparatus always essentially comprises first an arc and resistance furnace for the fusion of the ore; second an indirect resistance furnace for refining the rough metal. The first furnace remains such as it has been previously described. But the second furnace can be composed, for example of two containers filled with carbon, each furnished with a pair of electrodes, of opposite poles, which permit these carbons to be maintained at a red white heat. These containers communicate with the first furnace by channels arranged in such manner that the zinc vapors and the gases diluting them can pass at will from the first fusion furnace alternately into the one or other of these containers. Further, each of these containers communicates with a common space serving to condense the zinc vapors arising from the distillation effected in the one or the other of them. The channels causing the fusion furnace to communicate on the one hand with each of the redistillation containers, and on the other hand, these latter with the common condenser, are provided with suitable valves.

The working is then as follows:—While a charge of ore is treated in the fusion furnace, the zinc vapors and the gases emitted are directed into one of the two containers filled with carbon; the channel of communication of the other container with the fusion furnace is closed by its valve, and the channel of communication with the condenser of the container receiving the zinc vapors and the gases is also closed. This latter container then fills with drops and zinc powder; its electrodes do not at this time receive any electric current and distillation cannot be produced. The incondensable gases traverse the container and become deprived of all the zinc powder carried with them and are evacuated. At the end of a certain time when the container is full of zinc powder and drops, its channel of communication with the fusion furnace is closed and that which puts it in relation with the condenser is opened. Then current is sent into the electrodes, so as to carry the carbon to the temperature of distillation. Then, the zinc, retained in the spaces between the pieces of carbon, passes to the state of vapors which go to be liquefied to the state of purity in the condenser. The large drops of metal, by reason of their mass, fall directly to the bottom of the container where they are collected. While this second phase, of redistillation is effected in the container under consideration, the first phase of filling the adjoining container with drops and zinc powder is proceeded with and so on.

The working of the fusion furnace is continuous as also that of the single condenser; excepting that the two intermediate containers of redistillation are alternately at the phases of filling and of redistillation. In this system, the carbon of these containers remains unmoved during the working of the whole of the apparatus; the charges of carbon are only removed at long periods, for renewing them when they are dirtied by the impurities which they retain.

It is well to remark that, in the new process and furnace, the ores are treated by igneous fusion. It is also important to remark that other modifications can also be adopted, notably the following.

In lieu of having a space serving as a common condenser for the two redistillation containers, the zinc vapors can be condensed directly within the containers themselves, upon the carbon in a convenient part of their space, by subtracting from them by a convenient circulation the gases and zinc vapors, on the one hand, on the filling of their interstices by the zinc powder and on the other hand by electric heating. Finally, in lieu of having for one fusion furnace two redistillation or refining containers, only a single container can be employed, either furnished with an empty condenser, or by causing the condensation of the redistilled zinc on the carbon itself of a certain part of this container. In this case, by sending and interrupting the electric current, this redistillation or refining furnace is caused to pass successively through the phases of filling with zinc powder, then of redistillation. By combining in a suitable manner these phases with those of charging the fusion furnace and with the movement of the fusion beds, there might nevertheless be obtained with an apparatus thus arranged, an economic working practically continuous.

The above arrangements are given only by way of example; all the details of execution of the process, as also the forms, dimensions and arrangements of detail of the apparatuses may be varied in all cases, without changing the principle of the invention.

Claims:

1. An apparatus for extracting zinc from ores in a state of purity, comprising a furnace for melting the ores, and a refining furnace into which the zinc vapors from the melting furnace are delivered, said refining furnace being provided with means for condensing the zinc vapors in the form of drops or powder, and with means for redistilling the zinc drops or powder, whereby the metal will be refined successively with the production thereof while at a temperature next to the point of volatilization thereof.

2. An apparatus for extracting zinc from ores in a state of purity, comprising a furnace for melting the ores, and a refining furnace into which the zinc vapors and gases from the melting furnace are delivered, said refining furnace having means for separating the gases from the vapors, means for condensing the vapors in form of drops or powder, and means for redistilling the drops or powder whereby the metal will be refined successively with the production thereof while at a temperature next to the point of volatilization thereof.

3. A continually working apparatus for carrying out the herein described process, comprising an electric furnace with an arc and resistance for melting the ores, and an electric furnace with an indirect resistance having a communication with the first named furnace and comprising a zone wherein the gases evolved from the charge are separated from the zinc vapor and the said vapor condensed in droplets or powder, and a zone wherein the droplets or powder are subject to further distillation.

4. A continually working apparatus for carrying out the said process, as described, comprising an electric furnace with an arc and resistance, wherein melting ores is effected, an electric furnace with an indirect resistance having a communication with the first-named furnace and comprising a zone wherein is effected the separation of the zinc vapor proceeding from the burden and condensation of the zinc droplets or powder, a zone wherein a further distillation of the said droplets or powder is effected, and a zone wherein the condensation of the pure vapor of zinc takes place.

5. A continually working apparatus for carrying out the process, as described, comprising an arc and resistance furnace for vaporizing the zinc, an indirect resistance furnace for distilling the vapors coming from the first furnace, a chamber at the top of the second furnace and communicating with the first furnace, and a column of carbon in the chamber below its communication with the said first furnace and electrically heated for vaporizing the zinc powder condensed in said chamber upon the carbon.

6. A continually working apparatus for carrying out the process, as described, comprising an arc and resistance furnace for vaporizing the zinc, an indirect resistance furnace for distilling the vapors coming from the first furnace, a chamber at the top of the second furnace and communicating with the first furnace, a column of carbon in the chamber below its communication with the said first furnace and electrically heated for vaporizing the zinc powder condensed in said chamber upon the carbon, and a second column of carbon separate and distinct from the first carbon column and separating said chamber from the exterior.

7. A continually working apparatus for carrying out the process, as described, comprising an arc and resistance furnace for vaporizing the zinc, an indirect resistance furnace communicating with the first furnace for distilling the vapors coming therefrom, a chamber at the top of the second furnace, a column of carbon in the chamber below its communication with the said first furnace, and electrically heated for vaporizing the zinc powder condensed in the said chamber upon the carbon, and a condenser for collecting the pure zinc.

8. A continually working apparatus for carrying out the process, as described, comprising an arc and resistance furnace for vaporizing the zinc, an indirect resistance furnace communicating with the first furnace for distilling the vapors coming therefrom, a chamber at the top of the second furnace, a column of carbon in the chamber below its communication with the said first furnace and electrically heated for vaporizing the zinc powder condensed in the said chamber upon the carbon, and an annular condenser surrounding the lower portion of said chamber for collecting the pure zinc.

9. A continually working apparatus for carrying out the process, as described, comprising an arc and resistance furnace for vaporizing the zinc, an indirect resistance furnace communicating with the first furnace for distilling the vapors coming therefrom, a chamber at the top of the second furnace, a column of carbon in the chamber below its communication with the said first furnace and electrically heated for vaporizing the zinc powder condensed in the chamber upon the carbon, an annular resistance for heating said chamber, and an annular condenser surrounding the lower portion of said chamber for collecting the pure zinc.

10. A continually working apparatus for carrying out the process, as described, comprising an arc and resistance furnace for vaporizing the zinc, an indirect resistance furnace communicating with the first furnace for distilling the vapors coming therefrom, a chamber at the top of the second furnace, a column of carbon in the chamber below its communication with the said first furnace and electrically heated for vaporizing the zinc powder condensed in the chamber upon the carbon, an annular resistance for heating said chamber, an annular condenser surrounding the lower portion of the chamber for collecting the pure zinc, and a second column of carbon separate and independent from the first column separating the chamber from the exterior.

11. A continually working apparatus for carrying out the process, as described, comprising an arc and resistance furnace for vaporizing the zinc, an indirect resistance furnace for distilling the vapors coming from the first furnace, a chamber at the top of the second furnace, a column of carbon electrically heated for vaporizing the zinc powder, a column of carbon separating said chamber from the exterior, and a narrowing of the container forming an annular electrode.

12. A continually working apparatus for carrying out the process, as described, comprising an arc and resistance furnace for vaporizing the zinc, an indirect resistance furnace for distilling the vapors coming from the first furnace, a chamber at the top of the second furnace, a column of carbon electrically heated for vaporizing the zinc powder, and a condenser constituted by vertical compartments, arranged around the column of carbon electrically heated.

13. A continually working apparatus for carrying out the process, as described, comprising an arc and resistance furnace for vaporizing the zinc, an indirect resistance furnace communicating with the first furnace for distilling the vapors coming therefrom, a chamber at the top of the second furnace, a tube of refractory material depending into the chamber, a column of carbon in said chamber below its communication with the said first furnace and electrically heated for vaporizing the zinc powder condensed in the chamber upon the carbon, and a carbon container above the said chamber and communicating with the said tube, said container being open at its top.

14. A furnace for extracting metals from ores, comprising a furnace for melting the ores, and an electric furnace into which the vapors from the first furnace are delivered, a column of carbon in the said furnace, the lower portion of which is electrically heated, means for condensing the vapors upon the top of the carbon column, and means whereby the carbon at the lower end of the column may be removed to cause the column to descend.

15. A furnace for extracting metal from ores, comprising a furnace for melting the ores, an electric furnace into which the vapors from the first furnace are delivered, a column of carbon in the said furnace, the lower portion of which is electrically heated, means for condensing the vapors upon the top of the carbon column, means for delivering carbon upon the condensed vapor on the carbon column, whereby to form alternate layers of carbon and metal, and means whereby the carbon at the lower end of the column may be removed to cause the column with its alternate layers to descend.

The foregoing specification of our process and electric furnace permitting the extraction in a state of purity, of zinc from its ores, signed by us this 10th day of July, 1914.

EUGÈNE FRANÇOIS CÔTE.
PAUL RAMBERT PIERRON.

Witnesses:
H. BERNARD,
JOHN J. ERNSTER.